US008870369B2

(12) United States Patent
Wagner

(10) Patent No.: US 8,870,369 B2
(45) Date of Patent: Oct. 28, 2014

(54) SPECTACLES, DEVICE HAVING A SPECTACLES ELEMENT AND A HINGE PART, AND METHOD FOR FASTENING A HINGE PART TO A SPECTACLES ELEMENT

(76) Inventor: Reiner Wagner, Ispringen (DE)

( * ) Notice: Subject to any disclaimer, the term of this patent is extended or adjusted under 35 U.S.C. 154(b) by 258 days.

(21) Appl. No.: 13/390,786

(22) PCT Filed: Aug. 21, 2010

(86) PCT No.: PCT/EP2010/005143
§ 371 (c)(1),
(2), (4) Date: Feb. 16, 2012

(87) PCT Pub. No.: WO2011/023345
PCT Pub. Date: Mar. 3, 2011

(65) Prior Publication Data
US 2012/0147318 A1    Jun. 14, 2012

(30) Foreign Application Priority Data

Aug. 28, 2009 (DE) .......................... 10 2009 039 959
Sep. 25, 2009 (DE) .......................... 10 2009 048 496

(51) Int. Cl.
*G02C 5/14* (2006.01)
*G02C 5/22* (2006.01)
*G02C 13/00* (2006.01)
*B23K 26/24* (2014.01)
*B23K 26/26* (2014.01)
*B23K 26/32* (2014.01)

(52) U.S. Cl.
CPC ............ *G02C 5/2236* (2013.01); *G02C 13/001* (2013.01); *G02C 5/146* (2013.01); *B23K 26/243* (2013.01); *B23K 26/26* (2013.01); *B23K 26/3206* (2013.01); *B23K 26/322* (2013.01); *B23K 2203/04* (2013.01); *B23K 2203/14* (2013.01); *G02C 2200/30* (2013.01)
USPC ............................ 351/119; 351/121; 351/140

(58) Field of Classification Search
CPC ............ G02C 5/14; G02C 5/146; G02C 5/22; G02C 13/00; G02C 13/001
USPC ............. 351/111, 121, 140, 153, 119; 16/228
See application file for complete search history.

(56) References Cited

U.S. PATENT DOCUMENTS 4,178,081 A * 12/1979 Metcalfe ........................ 351/153
5,533,233 A    7/1996 Wagner et al.
(Continued)

FOREIGN PATENT DOCUMENTS

CN        1975512 A     6/2007
DE     19703293 A1     6/1998
(Continued)

OTHER PUBLICATIONS

First Office Action regarding Chinese Patent Application No. 201080047009.8 dated Mar. 14, 2013.
(Continued)

*Primary Examiner* — Huy K Mai
(74) *Attorney, Agent, or Firm* — Harness, Dickey & Pierce, P.L.C.

(57) ABSTRACT

Spectacles have a middle part and at least one earpiece, such that the at least one earpiece is pivotably connected to the middle part by a hinge. The hinge includes two hinge parts, a first of which is arranged on the at least one earpiece and a second of which is arranged on the middle part. At least one of the hinge parts is attached to the middle part or to the earpiece by laser welding. On at least one longitudinal edge of the hinge part, a continuous weld produced by conduction welding is formed.

24 Claims, 9 Drawing Sheets

(56) References Cited

U.S. PATENT DOCUMENTS

| | | |
|---|---|---|
| 2010/0162525 A1 | 7/2010 | Wienicke et al. |
| 2012/0024828 A1* | 2/2012 | Oowaki et al. ............ 219/121.64 |
| 2012/0274894 A1* | 11/2012 | Senatore et al. ......... 351/159.68 |

FOREIGN PATENT DOCUMENTS

| | | |
|---|---|---|
| DE | 19956328 A1 | 6/2001 |
| EP | 0615149 A1 | 9/1994 |
| EP | 0679920 A1 | 11/1995 |
| EP | 1518633 A1 | 3/2005 |
| EP | 1617276 A1 | 1/2006 |
| JP | 2007-222891 A | 9/2007 |
| WO | 02/46831 A1 | 6/2002 |
| WO | 2007/134949 A1 | 11/2007 |

OTHER PUBLICATIONS

International Search Report and Written Opinion of the ISA, ISA/EP, Rijswijk, NL, mailed Dec. 3, 2010.

English Translation of the International Preliminary Report on Patentability issued Mar. 6, 2012, incorporating the English Translation of the Written Opinion of the ISA for PCT/EP2010/005143, ISA/EP, Rijswijk, NL, mailed Dec. 3, 2010.

* cited by examiner

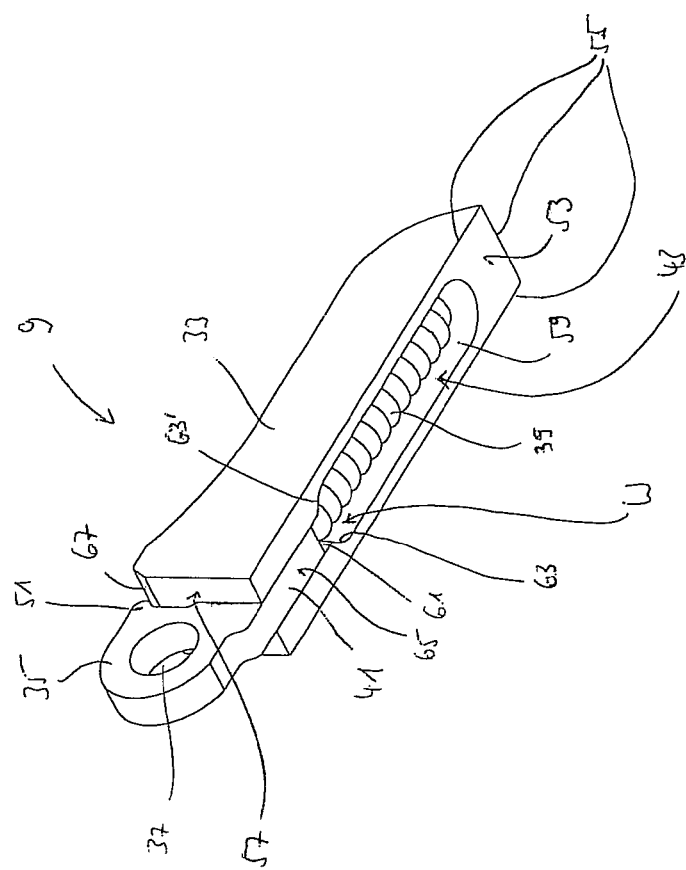

SPECTACLES, DEVICE HAVING A SPECTACLES ELEMENT AND A HINGE PART, AND METHOD FOR FASTENING A HINGE PART TO A SPECTACLES ELEMENT

CROSS-REFERENCE TO RELATED APPLICATIONS

This application is a 371 U.S. National Stage of International Application No. PCT/EP2010/005143, filed Aug. 21, 2010, which claims the benefit of German Patent Applications DE 102009039959.3, filed Aug. 28, 2009, and DE 102009048496.5, filed Sep. 25, 2009. The entire disclosures of the above applications are incorporated herein by reference.

FIELD

The present patent application relates to a device and a method for fastening a hinge part to a spectacles element.

BACKGROUND

Spectacles of the type mentioned here are known. They have a middle part and at least one earpiece. To be able to accommodate the spectacles in a space-saving manner in a case, for example, the earpiece is pivotable from a wearing position, in which its longitudinal extent forms an angle of essentially 90° to a plane defined by the middle part, into a resting position, in which the earpiece is aligned essentially in parallel with the middle part. To this end, the at least one earpiece is pivotably connected to the middle part by a hinge in a pivotable manner. The hinge comprises two hinge parts, a first of which is arranged on the at least one earpiece and a second of which is arranged on the middle part. With known spectacles, it is possible to provide that the hinge is welded to the earpiece with its first hinge part and is welded to the middle part with its second hinge part. It is also possible to weld only one of the hinge parts to the respective spectacles element, which may be designed as a spectacles earpiece or as a middle part, while the other hinge part is attached to the respective spectacles element by a different method. For example, electric resistance welding may be used as the typical welding method, wherein welding lugs are preferably provided on the hinge parts. This welding method is a disadvantage because a connection between the hinge parts and the respective spectacles elements is accomplished only at defined spot welds. Gaps may be formed in this way, so that the housing of a hinge is not sealed in a liquid-tight or airtight manner in particular. Furthermore, high pressures are required for welding, which is why the hinge must have a comparatively great wall thickness to be able to absorb the forces without being deformed. The disadvantages mentioned above do not occur in laser welding. Nevertheless this method is used only to a very minor extent in conjunction with spectacles because various materials, which are preferred in this area, can be joined together by laser welding only to a limited extent. This is the case, for example, because so-called deep penetration welding is generally used as the welding method. In this method, the welding laser operates at a high beam intensity on the order of magnitude of several megawatts per square centimeter, for example, forming a steam capillary in the melt in the direction of the beam, this steam capillary in turn extending to the depth of the material. If the material comprises a hinge part or a spectacles element made of zinc, for example, as is the case with nickel silver, the zinc vapor formed in deep penetration welding may become oxidized, thus forming zinc oxide in the area of the weld. This leads to embrittlement of the weld, which can easily rupture and/or the welded hinge part could easily break off.

SUMMARY

The object of the invention is to create spectacles in which at least one hinge part can be attached to a spectacles element by laser welding, there being no restriction with respect to the materials that can be welded to one another, there being no embrittlement of the seam in particular when one of the materials to be welded comprises zinc or some other materials that are sensitive to oxidation.

This object is achieved by spectacles characterized in that at least one of the hinge parts is attached to the middle part or to the earpiece by laser welding, in particular by seam welding. The term "seam welding" here suggests that the welding laser is used not to create individual spot welds but instead to create at least one seam having a greater longitudinal extent than its width so that any rate this is not a single spot weld. A continuous weld which is created by conduction welding is formed on at least one longitudinal edge of the hinge part. The term "continuous" indicates that the weld is created not by radiation bombardment of successive areas that are set apart from one another, optionally overlapping, but instead the weld is continuous along its longitudinal extent. To this end, a laser beam and the parts to be welded are moved in relation to one another, preferably at an essentially constant rate, such that the laser beam has an essentially constant power and/or intensity along the longitudinal extent of the seam to be created. The laser power and/or intensity and/or the relative speed between the laser beam and the parts to be welded are preferably varied as a function of the seam length to be created. The term "conduction welding" indicates that a beam intensity which is much lower than the intensity typically used in deep penetration welding is used here. The intensity selected for conduction welding is not sufficient to create a steam capillary. Thus materials that are sensitive to oxidation are not evaporated to an extent that would lead to critical amounts of oxides of these materials in the resulting weld. In particular the amount of heat input per unit of time into the material to be welded is reduced, so that a melt without any mentionable vapor component can be formed. Furthermore, great temperature gradients are prevented. Consequently, the seam does not become embrittled, thus resulting in a more stable connection of the parts being welded together in comparison with the prior art when using materials that are sensitive to oxidation.

An exemplary embodiment of spectacles in which the weld is created by a continuous wave laser is preferred. In contrast with the pulsed lasers, which are typically used and have a comparatively short pulse duration, a continuous wave laser readily permits a comparatively low, continuous heat input, so there is no mentionable production of steam, and this prevents embrittlement of the seam due to materials that are sensitive to oxidation. The power and/or intensity of the laser beam is/are preferably kept essentially constant along the longitudinal extent of the seam to be created.

An exemplary embodiment, in which the weld is created using a pulsed laser, such that it is created within the duration of a single laser pulse along its extent, is also preferred in particular. In the case of known welding methods with the help of pulsed lasers, a comparatively short pulse length is used, during which the heat input into the material to be welded is very high. The result is a great temperature gradient and possibly the production of steam capillaries. In contrast with this, the present invention provides for lengthening of the duration of the pulse, so that instead of creating a single spot weld per pulse, a continuous seam is created within the duration of the pulse along its extent. This also yields a continuous, reduced heat input, so it is possible to prevent the steam production, which can be harmful. Due to the fact that the weld is created continuously within the duration of a single pulse along its extent, the result is not the typical manifestation of a welding bead, which has individual spot welds arranged side by side so they overlap, usually created by a sequence of laser pulses, but instead the seam produced continuously with a single pulse along its extent has a continuous appearance, resembling that of a weld produced or soldered using a continuous wave laser. The power and/or intensity of the laser pulse is/are preferably essentially constant along the longitudinal extent of the seam to be created, and certain variations in these parameters may occur during the pulse duration. For example, the power of a pulsed laser during a pulse duration always has a time characteristic, which cannot approach a constant to any optional extent. An attempt is preferably made to keep the power and/or intensity as constant as possible along the length of the seam being created. This should ensure a continuous heat input over the entire length of the seam.

Additional advantageous embodiments are derived from the dependent claims.

Known devices comprise a spectacles element embodied as a spectacles earpiece or the middle part of spectacles. The hinge part may be welded to the spectacles element, resulting in the disadvantages already mentioned here in conjunction with the spectacles.

The object of the invention is therefore to create a device with which the hinge part is attached to the spectacles element with the help of a laser welding method, so that the disadvantages described in conjunction with these spectacles do not occur.

This device is characterized in that the hinge part is arranged on the spectacles element and is attached by laser welding, in particular seam welding. A continuous weld is formed at least on one longitudinal edge of the hinge part, this seam being produced by conduction welding. As already described in conjunction with the spectacles, a reduced continuous heat input into the materials to be welded is achieved in this way, so that the formation of steam of materials that are sensitive to oxidation in particular is reduced. This device may therefore comprise a plurality of materials, which previously could not be welded, at least not with the help of a laser welding method.

Additional advantageous embodiments are derived from the dependent claims.

Known methods for fastening a hinge part on a spectacles element comprise the following steps: First, the hinge part is arranged on the spectacles element. Then the hinge part is typically fastened with the help of a welding or soldering method. Soldering methods are a disadvantage because then the entire hinge part is heated to a great extent, which can thus impair the function of the spring hinges in particular. Therefore, they cannot be soldered as a module to the spectacles element, but instead a separate housing must first be soldered, whereupon additional elements can be introduced into this housing after fastening same. The housing of the hinge part must also have a certain wall thickness so as not to be deformed due to the intense heating. Methods based on electric resistance welding or laser welding have the disadvantages already mentioned in conjunction with the spectacles and the device.

One object of the present invention is therefore to create a method which enables the attachment of relatively narrow hinge parts having thin walls in particular onto a spectacles element, wherein the hinge parts may be attached as a module to the spectacles element. Severe heating or high mechanical pressing forces on the hinge part should be avoided in this process. At the same time, the disadvantages of a known laser welding method discussed in conjunction with the spectacles should be avoided, so that the materials to be welded may be selected almost at will without resulting in embrittlement of the weld due to the formation of unwanted oxidation products.

This object is achieved by a method characterized by the following steps: a continuous weld is produced at least along one longitudinal edge of the hinge part, such that the weld is produced by conduction welding. Conduction welding with the help of a welding laser permits a very local, relatively minor and continuous heat input into the parts that are to be welded, so that they neither undergo deformation due to excessive heating nor do they sacrifice their function. At the same time, high pressing forces are not necessary, so that a hinge part to be welded by this method can be designed to be relatively narrow and to have thin walls. The relatively low heat input characterizing conduction welding, which takes place continuously along the longitudinal extent of the seam to be produced, prevents the production of seam of materials that are sensitive to oxidation in particular, at least to a great extent, so that there is no embrittlement of the weld to be formed.

To produce the weld, a laser beam and the parts to be welded are moved, preferably at an essentially constant speed, in relation to one another along the longitudinal extent of the seam to be produced. The laser power and/or the laser intensity is/are kept essentially constant to ensure a continuous heat input over the total seam length. The laser power, laser intensity and/or relative speed may be varied, preferably depending on the seam length to be produced.

In comparison with known laser-welded seams, which are produced with the help of a sequence of laser pulses and therefore have a so-called welding bead, a seam produced during a single laser pulse instead tends to have the appearance of a soldered joint. Filler materials such as solder, for example, can easily be omitted, so that this method does not require the use of environmentally harmful substances.

However, an exemplary embodiment in which a filler material is used to produce the weld is also preferred. For example, one of the materials comprised of at least one of the parts to be welded may be used here. However, at least one other material having a lower melting point than the materials to be welded may also be used, so that the intensity of the welding laser and thus the peak input can be further reduced.

A method in which the weld is finished with a laser beam of a lower intensity after being produced is also preferred. The appearance of the weld can be improved and/or optimized from an aesthetic standpoint in particular in this way. For example, the weld may be smoothed. It is also possible to design the transition from the weld to the parts to be joined together, so that it is continuous, i.e., it is also possible to smooth the edges of the seam in particular.

DRAWINGS

The invention is explained in greater detail below on the basis of the drawings, in which FIG. 1 shows spectacles having a middle part and two earpieces;

FIG. 9 shows a module according to FIG. 7 inserted into the housing according to FIG. 8.

DETAILED DESCRIPTION

Figure 1:
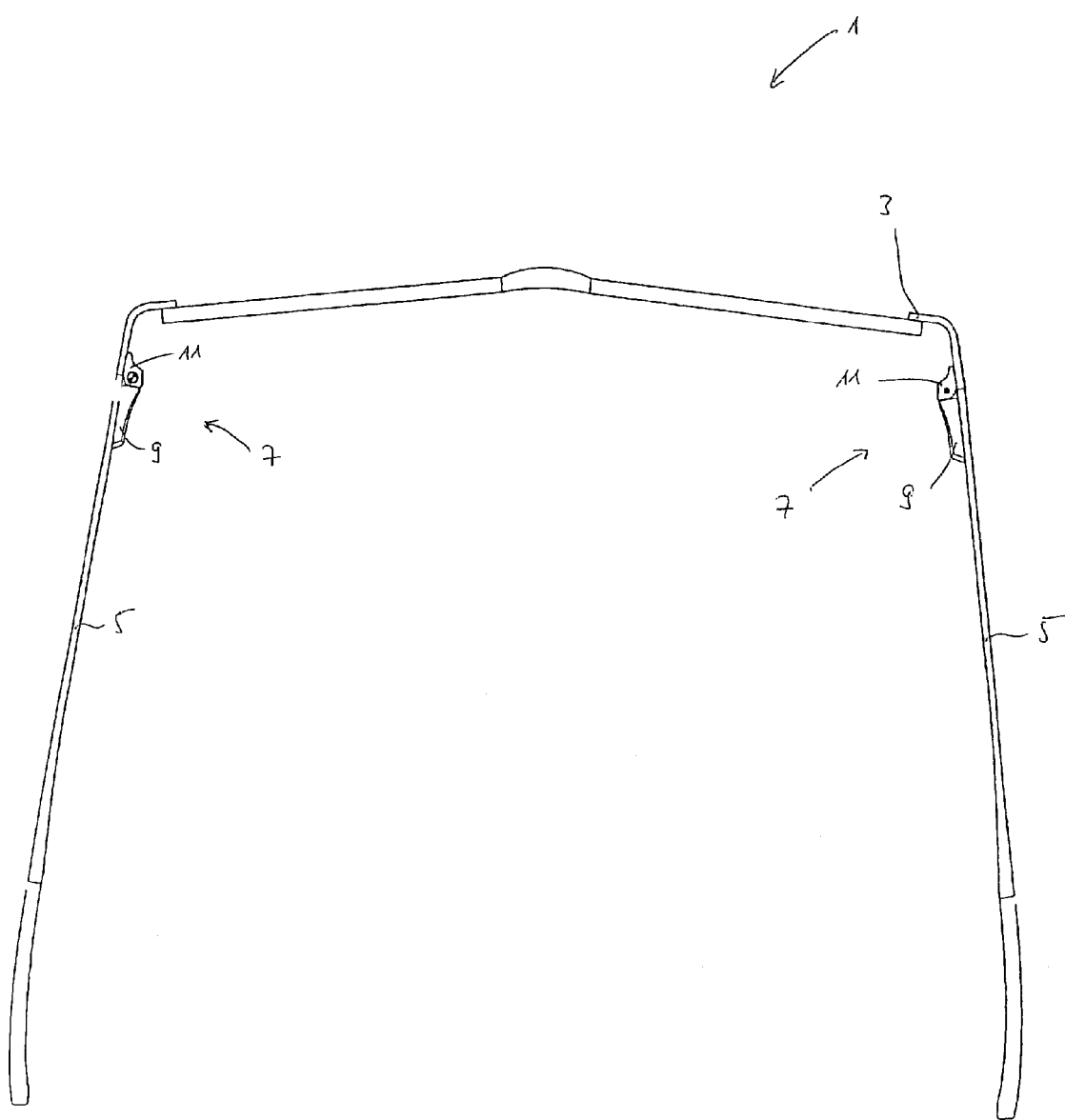

FIG. 1 shows a spectacles 1 having a middle part 3 and at least one earpiece 5. In the exemplary embodiment shown here, exactly two earpieces 5 are provided. The at least one earpiece 5 is pivotably connected to the middle part 3 by a hinge 7. The hinge comprises two hinge parts, a first hinge part 9 of which is arranged on the at least one earpiece 5 and a second hinge part 11 is arranged on the middle part 3.

The first hinge part 9 here is preferably designed as a spring hinge. In other exemplary embodiment of spectacles not shown here, however, other hinge parts, in particular simple hinge parts without a spring mechanism are also possible.

The two parts 9, 11 are preferably attached to the middle part 3 and/or to the earpiece 5 by laser welding, in particular seam welding. In another exemplary embodiment, it is possible to attach only one of the hinge parts 9, 11 by laser welding, in which case the other hinge part 9, 11 is attached in some other way. At any rate, it is true that what is said below with regard to welding the hinge part 9 to a spectacles element also applies to welding the hinge part 11 to a corresponding spectacles element.

Figure 2:
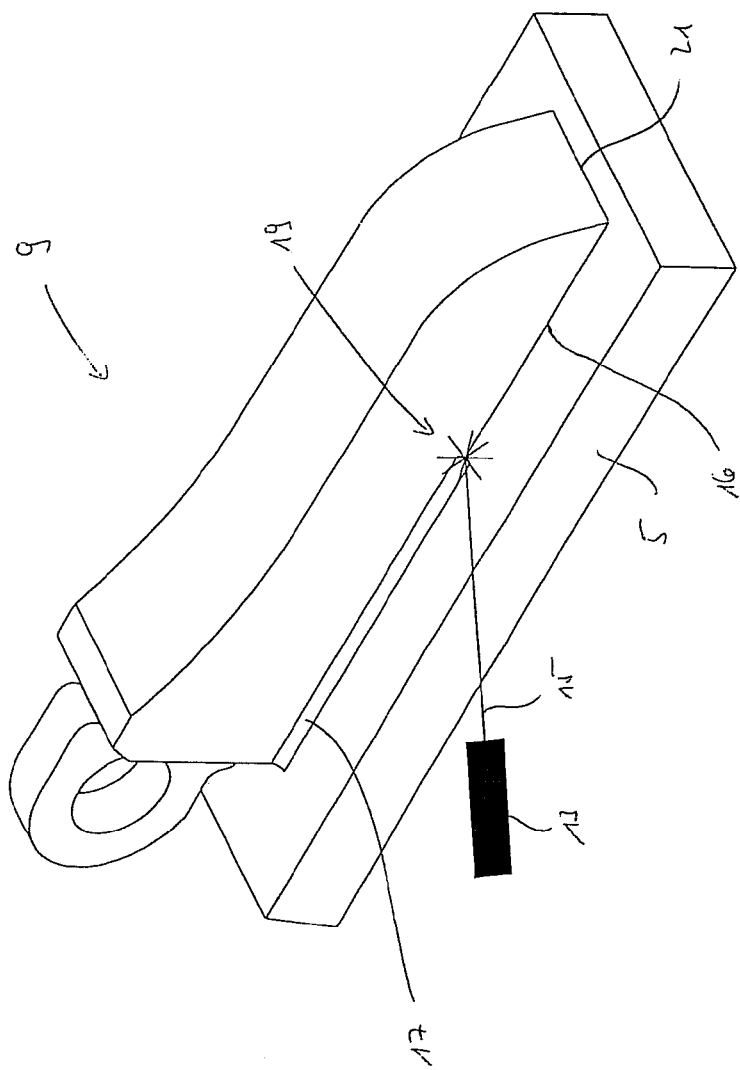
FIG. 2 shows a first view of a laser welding method for attaching a hinge part to a spectacles element.

FIG. 2 shows a first exemplary embodiment of a hinge part 9 which is designed as a spring hinge. It is attached to a spectacles element designed here as an earpiece 5, by means of a laser welding method. Therefore a welding laser 13 which produces a continuous weld 17 with the help of a laser beam 15 at least on one longitudinal edge 16 of the hinge part 9 is provided. The asterisk indicates schematically an area 19, in which the welding laser 13 produces the weld 17 with the help of the laser beam 15. To prevent the development of a steam capillary, the laser 13 is not operated here at the intensity that would typically be needed for deep penetration welding. The laser beam 15 is instead operating at the intensity at which it operates in the range of so-called conduction welding, wherein no steam capillaries are produced in the area of parts to be welded. Thus, in particular no materials that are sensitive to oxidation are evaporated. The diminished intensity of the laser beam 15 permits a continuous, reduced heat input along the longitudinal extent of the seam to be produced, avoiding great temperature gradients and thus preventing embrittlement of the weld 17 due to the formation of oxide.

The laser 13 is preferably embodied as a continuous wave laser, in particular as a diode laser, which allows a continuous, relatively low input of heat, so that the development of a steam capillary and ultimately the formation of oxides can be effectively prevented. With a continuous wave laser in particular, the heat input is not instantaneous, in comparison with a pulsed laser, so a sudden vaporization of material is prevented. The heat input at each individual location in the weld 17 can be varied by the relative speed of the laser beam 15 in relation to the parts to be welded, so that the heat input can be adapted to different materials to be welded in particular. The relative speed along the extent of the seam being produced is preferably kept essentially constant, so that a continuous and constant heat input is ensured. The value of the essentially constant rate of travel then determines the heat input per unit of length of the seam.

The weld 17 is designed as a continuous weld. This means that it is no produced in particular by overlapping alignment of individual welding areas, for example, spot welds, but instead is embodied as a continuous seam. It may extend along the entire longitudinal extent 16 of the hinge part 9. However, several welds 17 may also be provided along the longitudinal edge, so that preferably each individual weld is embodied as a continuous weld. In the exemplary embodiment shown in FIG. 2, the weld 17 is produced on the longitudinal edge 16 of the hinge part 9 facing the observer. In another preferred exemplary embodiment, a weld is also produced on the opposite longitudinal edge of the hinge part 9 facing away from the observer. Here again, a single continuous weld may also preferably be produced, comprising the entire longitudinal extent of the longitudinal edge. However, individual welds may indeed also be produced, preferably each being designed separately as a continuous weld. In yet another exemplary embodiment, it is also possible to provide a single weld on at least one of the longitudinal edges, such that this weld does not comprise the total extent of the longitudinal edge.

In a preferred exemplary embodiment, a weld can also be produced on a rear edge 21 of the hinge part 9, joining the two longitudinal edges to one another.

The laser 13 may preferably be embodied as a pulsed laser. In this case, the continuous weld 17 is produced along its extent within the duration of a single laser pulse. Pulse duration of the pulsed laser 13 is expanded in comparison with traditional pulse durations of pulsed lasers. In a preferred exemplary embodiment, it comprises approx. 50 ms, such as the weld 17 with a length of approx. 10 mm can preferably be produced in this period of time. Depending on the pulse energy and the materials to be welded, these values may be varied in other exemplary embodiments. In particular it is possible to vary the pulse duration and the rate of travel of the laser beam 15. It is also possible to vary the pulse energy in particular to coordinate it with the materials to be welded and the seam lengths to be produced. Ultimately all the parameters may be adapted and optimized to the desired conditions, i.e., the pulse energy, pulse duration and thus also pulse power, the diameter of the irradiated area and thus in particular the intensity of the irradiation as well as the rate of travel may be optimized.

In the case of pulsed laser, a certain amount of energy in the form of light is released per laser pulse.

In the case of pulsed lasers, a certain quantity of energy in the form of light is released with each pulse. The laser power during a pulse depends on the pulse duration. By prolonging the pulse duration the laser power is reduced so that the heat input into the parts to be welded is also reduced. At a conventional pulse duration, the laser 13 would produce a steam capillary, so that oxides of materials that are sensitive to oxidation could be formed, which would lead to embrittlement of the weld. By lengthening the pulse duration, the laser power is reduced to such an extent that the laser 13 is working in the range of conduction welding, so that no steam capillaries can be formed and embrittlement of the seam due to the formation of oxide is prevented.

In this way it is preferably possible to weld materials comprising zinc in particular. Nickel silver in particular (e.g., $CuNi_{18}Zn_{20}$) can be welded by the method according to the invention. With the known methods, zinc oxide is formed in the resulting steam capillary, which leads to embrittlement of the weld.

Thus at least one of the hinge parts may comprise nickel silver, and is preferably made of nickel silver. It is also possible for the at least one earpiece 5 and/or the middle part 3 of the spectacles 1 to comprise nickel silver, preferably to be made of nickel silver. In addition, at least one of the hinge parts and/or one of the spectacles elements may comprise steel, INOX or titanium, preferably being made of steel, INOX or titanium. It is also possible in particular to weld different materials together. For example, a hinge part of nickel silver may be welded to an earpiece made of steel. However, a hinge part made of steel may also be welded to a middle part or an earpiece made of nickel silver. A welded connection of nickel silver to nickel silver is also possible. Other combinations of materials for spectacles elements and hinge parts are also possible.

The continuous seam formed by the welding method is recognizable in particular by the fact that it has no so-called welding bead. A welding bead is formed by the fact that several spot welds arranged side by side so they overlap are provided to produce the weld. In the present case, the weld 17 is preferably produced by a continuous wave laser, but especially preferably is produced by a pulsed laser within the period of a single laser pulse along its extent. Thus, instead of forming discrete spot welds arranged side by side so they overlap, the weld 17 is designed to be constant and continuous.

In a preferred exemplary embodiment a filler material may be used for welding. This may preferably comprise a material which also includes the hinge part and/or the spectacles element to be welded, onto which the hinge part is welded. However, a material different from the materials of the parts to be welded may also be used. Then a filler material having a melting point lower than that of the materials comprising the parts to be welded is preferably used. This permits a further reduction in the laser power and thus in the heat input, so that the risk of oxide formation and thus embrittlement of the weld is further reduced.

After the welding operation it is possible to finish the weld 17 either using the welding laser 13 or another laser in order to preferably improve the appearance of the weld 17. In particular the appearance should be improved from an aesthetic standpoint. By means of a laser beam having a lower intensity than the laser beam 15 which is used for welding, the seam can be smoothed in particular. The edges of the seam can also be also be smoothed, so that the transition from the weld 17 to the parts to be welded, i.e., the hinge part 9 and the earpiece 5 in the exemplary embodiment in FIG. 2, is designed to be continuous and without any visible step or edge.

Figure 3:
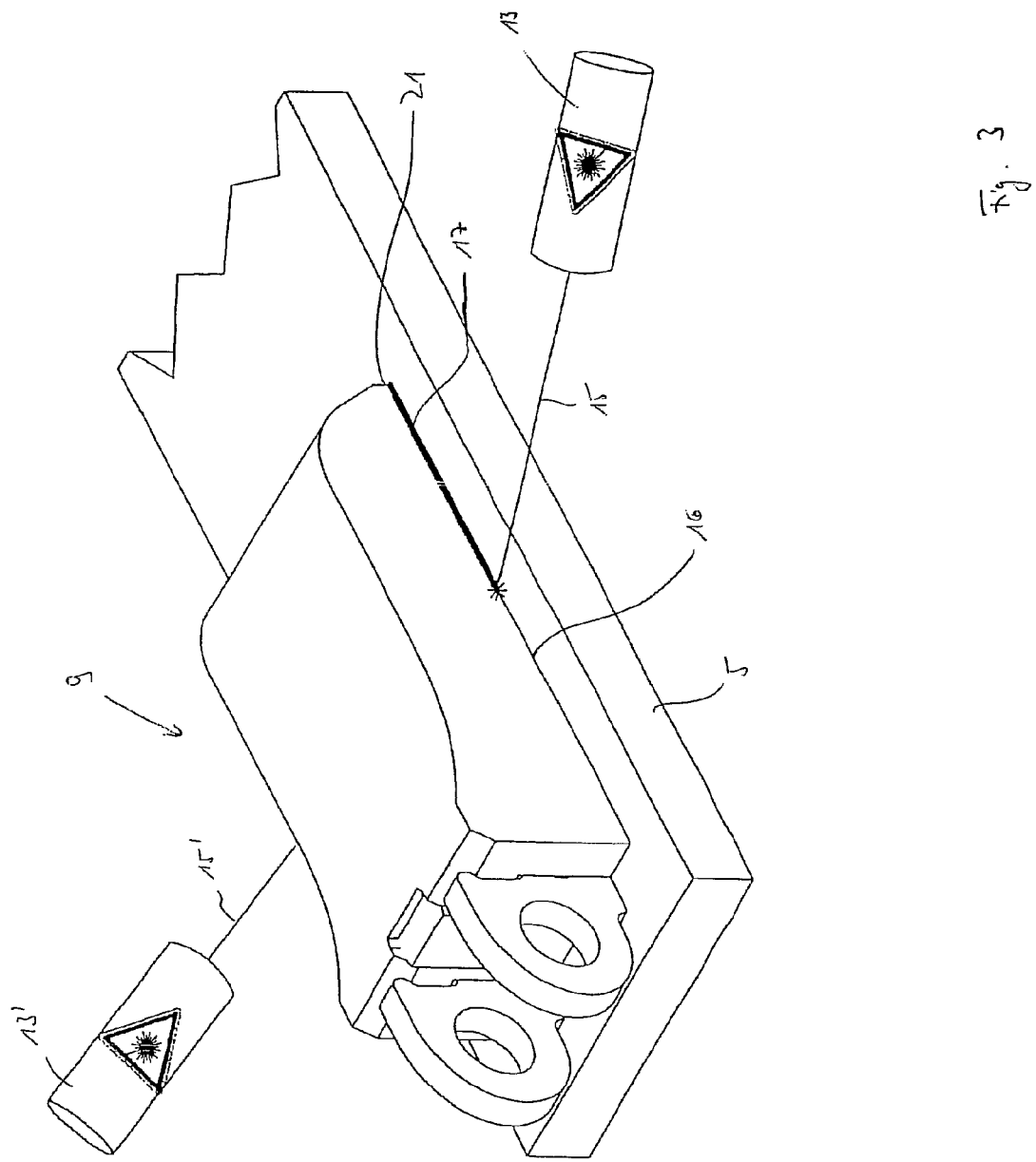
FIG. 3 shows a second view of a laser welding method.

FIG. 3 shows another exemplary embodiment of a first hinge part 9 embodied as a spring hinge, permanently welded to a spectacles element, which is embodied here as an earpiece 5, with the help of a laser welding method. The same elements and elements having the same function are labeled with the same reference numerals, so that reference is made to the preceding description in this regard. With another exemplary embodiment it is of course also possible for the first hinge part 9 which is embodied here as a spring hinge for example, to be welded to the middle part 3 of spectacles, in which case then the second hinge part 11 is welded onto a spectacles element embodied as an earpiece 5.

FIG. 3 shows that a weld is produced by a welding laser 13 and another welding laser 13' each having a laser beam 15, 15' on each of the two longitudinal edges of the hinge part 9. The weld 17 facing the observer here and the weld (not visible here) arranged on the opposite side, facing away from the observer, are especially preferably produced at the same time, so that welds can be produced on both longitudinal edges of the hinge part 9 in a time that would otherwise be expended for a single weld. If the pulse duration is preferably 50 ms in the case of a pulsed laser and if a continuous weld is produced on both longitudinal edges during this time, then the hinge part 9 can be welded to the earpiece 5 with the help of the laser 13, 13' within 50 ms. This greatly reduces the time required for fastening the hinge part 9 to the earpiece 5.

After or simultaneously with the welds produced on the longitudinal edges of the hinge part 9, a weld may preferably be produced on the edge 21 joining them. In one exemplary embodiment in which the weld 17 on the edge 16 and the opposite weld comprise the total longitudinal extent of the longitudinal edges, and in which a weld is additionally provided on the edge 21, also comprising its total longitudinal extent, the hinge part 9 which is closed on three of its sides is applied to the earpiece 5. Thus there are no longer any gaps or holes here so that no gases, liquids and/or dirt can penetrate. In particular no corrosive substances can penetrate into the interior of the hinge part 9 and impair its function, which would be a disadvantage in particular if the hinge part 9 were designed as a spring hinge. Thus the hinge part 9 can be applied to an earpiece 5 in an airtight and/or fluid-tight connection if welds which cover the entire extent of the edges are produced on three of its edges.

To produce the weld on one edge 21, a third laser (not shown here) may be provided. However, one of the laser beams 15, 15' can also be split by a prism, a semitransparent mirror or some other suitable lens in which case it can then produce a weld on one of the longitudinal edges and on the edge 21 at the same time. In yet another exemplary embodiment it is possible to arrange the weld on the edge 21 after the welds have been produced on the longitudinal edge of the hinge part 9.

To produce the welds, in one exemplary embodiment the lasers and/or laser beams may be moved along the extent of the seams to be produced, while the parts to be welded are stationary. Conversely, in another exemplary embodiment, it is possible to move the parts that are to be welded along the length of the seams to be produced, while the lasers and/or laser beams remain stationary. In yet another exemplary embodiment, both the lasers, i.e., the laser beams and the parts to be welded may be in motion, such that a relative movement between the lasers, i.e., the laser beams and the parts that are to be welded along the extent of the welds is ensured.

Figure 4:
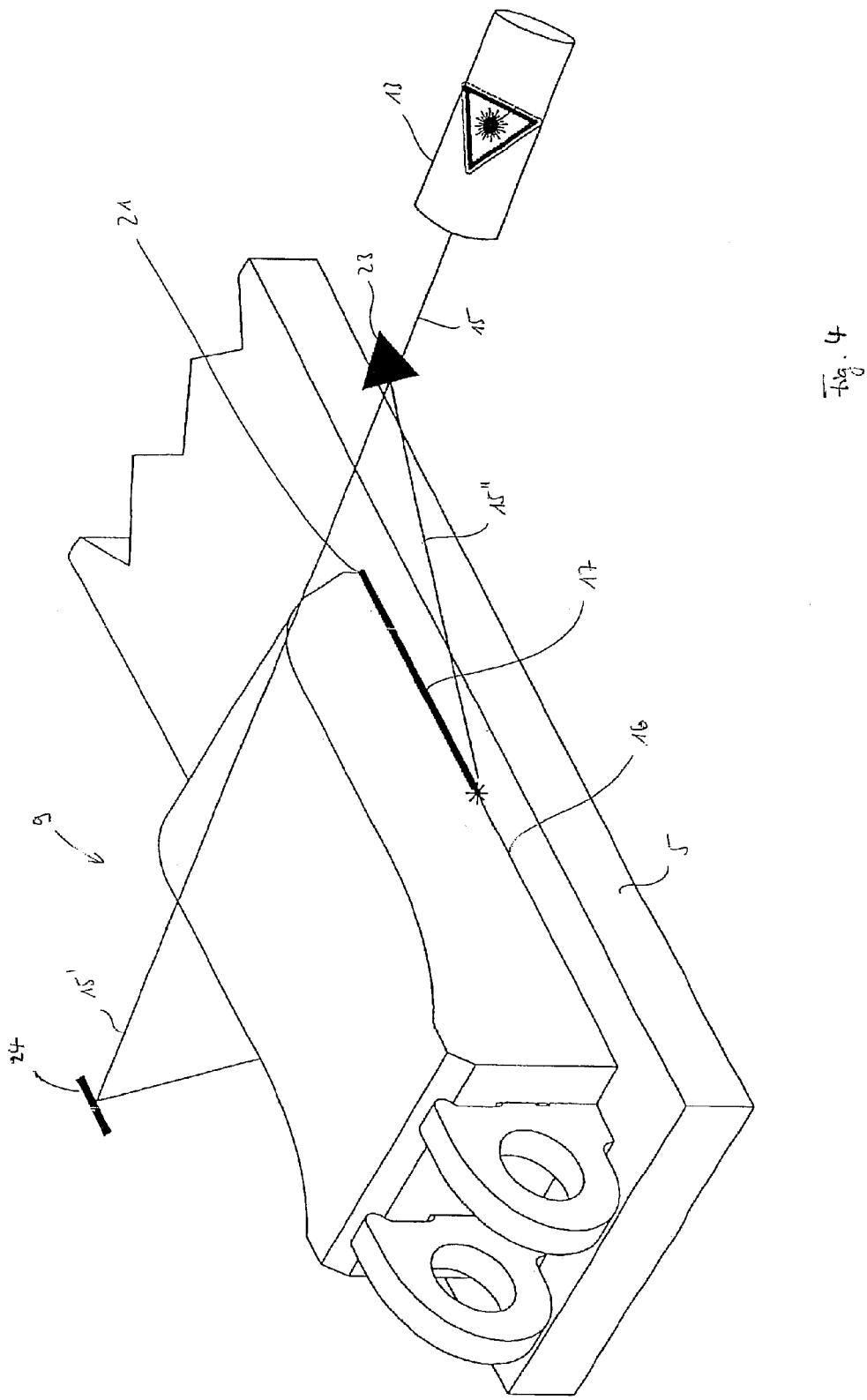
FIG. 4 shows another view of a laser welding method.

FIG. 4 shows another exemplary embodiment of a hinge part 9 which is embodied as a spring hinge and is welded onto a spectacles element, which is embodied here as the earpiece 5. The same elements and elements having the same function are provided with the same reference numerals so that reference is made to this extent to the previous description. A single welding laser 13 is provided here, its laser beam 15 being divided by a prism 23 into a first partial beam 15' and a second partial beam 15". In a preferred exemplary embodiment, instead of a prism 23, it is also possible to provide a system of prisms, a semitransparent mirror, a system of semi-transparent mirrors or some other type of lens. In the embodiment depicted here, the first laser beam 15' is deflected by a mirror 24 onto the longitudinal edge of the hinge part 9 which is facing away from the user, to produce a weld here (not shown). In another exemplary embodiment, instead of a single mirror 24, a mirror system or another suitable lens may be used. The second partial beam 15' in the exemplary embodiment shown here is deflected directly from the prism onto the longitudinal edge 16 of the hinge part 9 which faces the user, to produce the weld 17 there. In another exemplary embodiment, it is possible for the partial beam 15" to be deflected onto the longitudinal edge of the hinge part 9 by a mirror, a mirror system or another suitable lens. The mirror 24 and the prism 23 or lenses that are provided accordingly are preferably pivoted to produce welds along the extent of the longitudinal edges. In another exemplary embodiment the lenses may remain stationary while the parts to be welded are moved accordingly. A relative movement of these elements which ensures that the welds will be produced is essential. It is possible in this way to produce welds simultaneously on both longitudinal edges of the hinge part 9 within the duration of a single laser pulse of the preferably pulsed laser 13. In this exemplary embodiment the hinge part 9 can also be welded to the spectacles element which is embodied here as an eyepiece 5, within the pulse duration of a single laser pulse of the laser 13, so that no second laser is required here. Additional optical elements may preferably be provided to branch off a third partial beam (not shown here) which produces a weld along the edges 21. In this way welds can be produced during a single laser pulse on three edges of the hinge part 9 with the help of a single laser 13. The hinge part 9 may preferably be attached to the earpiece 5 preferably in an airtight and/or liquid-tight design if the walls that are produced comprise the total extent of the respective edges.

In another exemplary embodiment, a continuous weld which extends along all three edges of the hinge part 9 or the hinge part 11 can also be produced during a single laser pulse 15 by relative movement of a single laser beam in relation to the parts to be welded.

It has been found in particular that the laser welding method can be automated. The lasers or laser beams and/or laser partial beams may be moved in relation to the edges of the hinge part 9 and/or the hinge part 11 (not shown) in an automated process to weld them automatically. It is likewise possible to move the hinge part 9 or the hinge part 11 in an automated manner in relation to the lasers or the laser beams and/or laser partial beams. This permits a very rapid and automatic processing of the welding operation.

Figure 5:
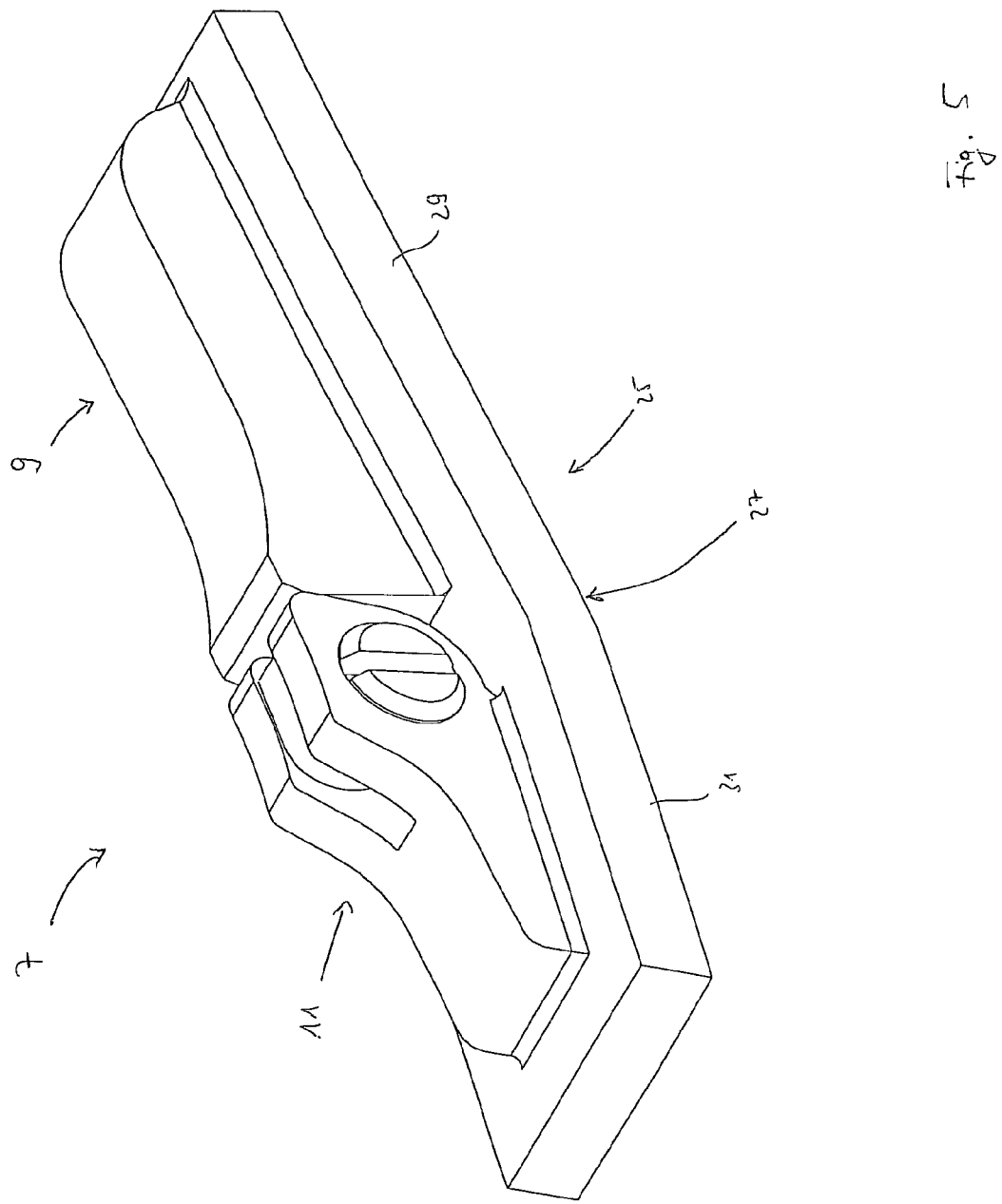
FIG. 5 shows an exemplary embodiment of a finished welded hinge.

FIG. 5 shows a complete hinge 7 which comprises a first hinge part 9 and a second hinge part 11. The hinge part 9 corresponds to the exemplary embodiment shown in FIG. 2 and is designed as a spring hinge. The same elements and elements having the same function are labeled with the same reference numerals so that reference is made to the preceding discussion in this regard. Both hinge parts 9, 11 here are welded together onto an earpiece blank 25 which is prebent in the area of a bending zone 27. The earpiece blank 25 is preferably first prebent before attaching the hinge 7 to it.

After the hinge 7 has been welded to the earpiece blank 25, the latter is preferably separated by means of a saw in the area of the bending zone 27, thereby forming an earpiece part 29 and a faceplate part 31. The earpiece part 29 corresponds essentially to the earpiece 5 of the preceding exemplary embodiments. The faceplate part 31 may be arranged on a middle part 3 of spectacles 1. In the exemplary embodiment shown here, the hinge part 9 is arranged on the earpiece part 29, such that the hinge part 11 is arranged on the faceplate part 31. In another exemplary embodiment, it is also possible for the hinge 7 to be attached conversely to the earpiece blank 25 so that the hinge part 9 is arranged on the faceplate part 31 and the hinge part 11 is arranged on the earpiece part 29.

Figure 6:
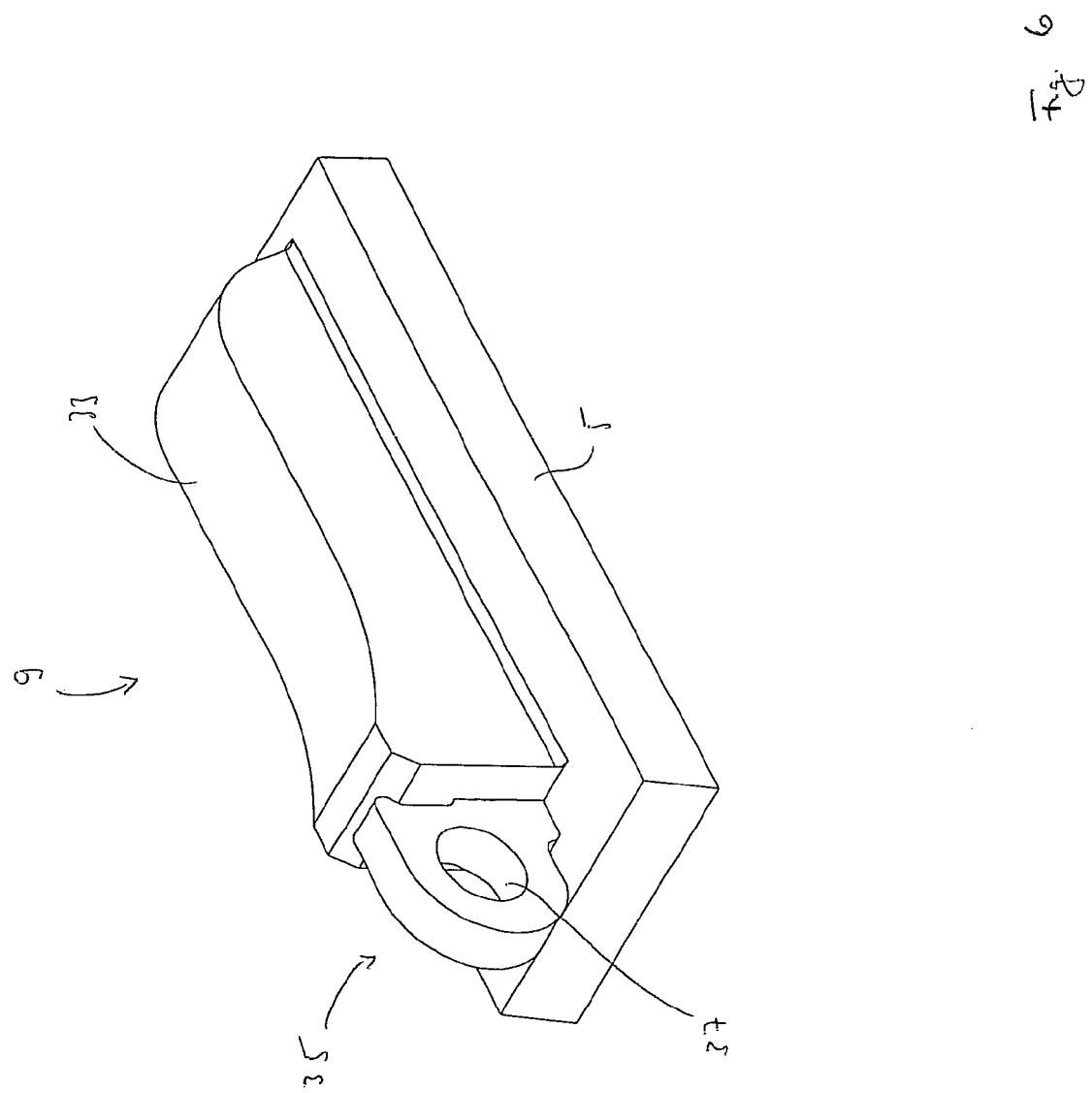
FIG. 6 shows a preferred exemplary embodiment of a hinge part designed as a spring hinge, which is welded to a spectacles element.

FIG. 6 shows the exemplary embodiment of a hinge part 9 which is designed as a spring hinge according to FIG. 2. The same elements and elements having the same function are provided with the same reference numerals, so that reference is made to the preceding description in this regard. The hinge part 9 here is welded to a spectacles element which is embodied as an earpiece 5. In another exemplary embodiment it is also possible for the hinge part 9 to be welded onto a spectacles element which is embodied as the middle part 3 of spectacles 1. As will be explained below, the spring hinge and/or hinge part 9 which is shown here is designed to be especially narrow and to have thin walls in particular, which is why the advantages of the laser welding method according to the invention are clearly manifested in conjunction with the exemplary embodiment of a spring hinge shown here. For this reason this exemplary embodiment is described in greater detail.

The hinge part 9 comprises a housing 33 and a hinge element 35 which is mounted therein so that it is displaceable in the longitudinal direction thereof but only one hinge eye 37 is shown here. The hinge eye 37 serves to connect the hinge part 9 to the hinge part 11 (not shown here).

Figure 7:
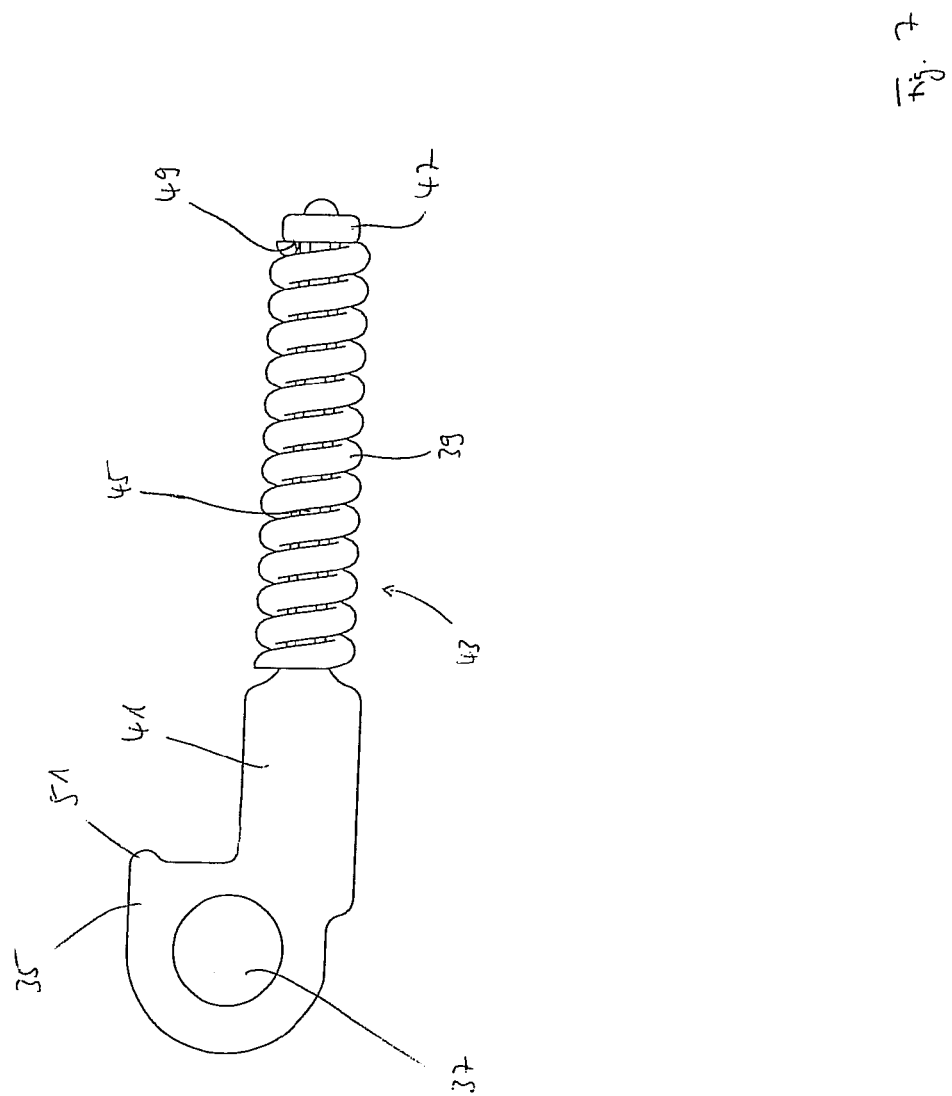
FIG. 7 shows a premounted module of the spring hinge according to FIG. 6, comprising a hinge element and a spring element.

FIG. 7 shows a premounted module of the hinge part 9 from FIG. 6. The same elements and those having the same function are provided with the same reference numerals, so reference is made to the previous discussion in this regard. The module comprises the hinge element 35 and a spring element 39. The hinge element 35 comprises a guide section 41, which is connected to the hinge eye 37 and develops into a receiving part 43 for the spring element 39.

In the exemplary embodiment shown here, the spring element 39 is embodied as a helical spring through which a pin 45 starting from the guide section 41 passes. The pin 45 serves here as a receiving part 43 for the spring element 39. The last end of the pin 45 on the right is preferably shaped, preferably squeezed or upset in the longitudinal direction of the pin 45, so that an end section 47 of the pin 45 protrudes forwards—as seen in the radial direction—so that the spring element 39 cannot slip out of the receiving area 43. Due to this anchoring, it is possible that the spring element 39 which is designed as a helical spring may be held securely on the pin 45 by the end section 47. A contact face 49 for the spring element 39 is provided on the end section 47.

It is also possible to fasten the spring element 39 on the pin 45 by some other method. In one exemplary embodiment, a ring which is pushed onto the pin 45 from the right may be provided. The ring may be held on the pin 45 by an end area that has preferably been pinched or otherwise deformed. However, the ring may also have inwardly directed protrusions, for example, with which it attaches to an outer peripheral surface of the pin 45. In another exemplary embodiment the ring may be shrunk, pressed, welded, soldered or glued onto the pin 45. However, it is preferably if the spring element 39 is in contact with a contact face 49 and is held by it on the pin 45, this contact face being formed by an end section 47 which has been deformed and protrudes in the radial direction. No additional fastening element, for example, a ring is necessary, which greatly simplifies the assembly of the module consisting of the hinge element 35 and the spring element 39.

In yet another exemplary embodiment, the receiving part 43 may preferably be also designed as a recessed area in a one-piece hinge element 35. Again in this case, the contact face 49 is designed in one piece with the remainder of the hinge element. The spring element 39 is inserted under prestress into the recessed area where it is held securely.

In yet another exemplary embodiment the spring element 39 may preferably be embodied as a meandering spring so that it is possible in particular for the hinge eye 37, the guide section 41 and the spring element 39 to be embodied in one piece.

In the area of the hinge eye 37 a nose 51 is formed on the hinge element 35, said nose protruding in the direction of the spring element 39 as seen in the longitudinal direction of the hinge element 35. It serves to additionally secure the hinge element 35 after it has been introduced into the housing 33.

As shown in FIG. 7, the hinge element 35 and the spring element 39 are preferably embodied as a premountable module. The spring element 39 is held on the hinge element 35—preferably by the deformed radially protruding end section 47—so that both elements can be handled together and in particular can be introduced into the housing 33 as a preassembled module.

Figure 8:
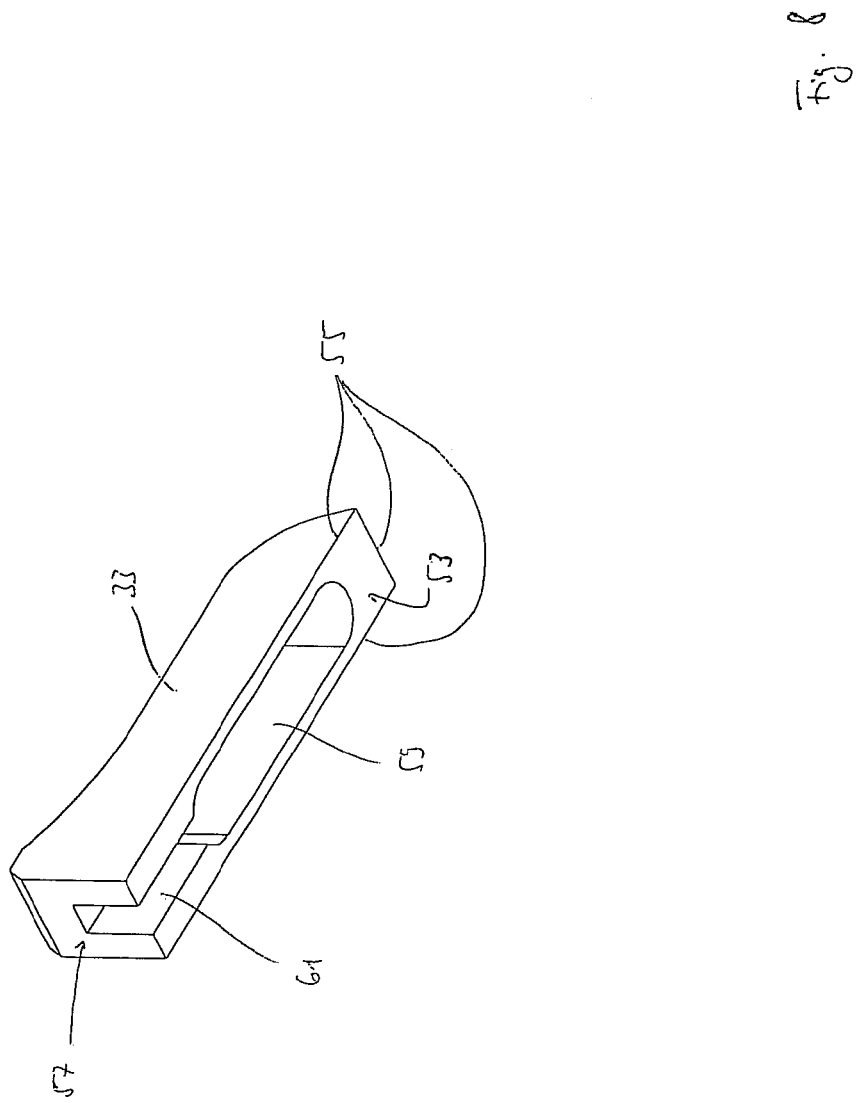
FIG. 8 shows a housing of the spring hinge according to FIG. 6.

FIG. 8 shows a view of the housing 33, in which a lower area 53 is visible. The same elements and those having the same function are labeled with the same reference numerals, so that reference is made to the previous description in this regard. The lower area 53 is placed on a spectacles element embodied as an earpiece 5, for example, for fastening the housing 33, and a continuous weld 17 is preferably produced along both longitudinal edges of the housing 33. Especially preferably at least one continuous weld is provided in the area of a peripheral edge 55 such that the end face 57 is preferably exposed.

The housing 33 is provided with a recess 59 which continues to the upper left in a bushing 61 as shown in FIG. 8. The bushing penetrates through the end face 57 of the housing 33. The width of the recess 59 as measured in the transverse direction of the housing 33 is greater than the width of the bushing 61. The term "transverse direction" as used here indicates the direction perpendicular to the longitudinal extent of the housing 33.

FIG. 9 shows the module comprising the hinge element 35 and the spring element 39, which is inserted into the housing 33. The same elements and those having the same function are provided with the same reference numerals so that reference is made to the preceding description in this regard. The hinge part 9 is completely assembled as a preassembled unit and/or module in FIG. 9. The width of the spring element 39 is preferably adapted to the width of the recess 59. This yields an abutment W in the transitional area between the recess 59 and the bushing 61, comprising two contact areas 63, 63' for the spring element 39. The length of the recess 59—as measured in the longitudinal direction of the housing 33—on the one hand and of the receiving part 43 and/or the spring element 39 on the other hand are coordinated with one another so that the spring element 39 is compressed when it is introduced into the recess 59. It then strikes the contact areas 63, 63' on one end and strikes the contact area 49 (not shown here) on the other end. The spring element 39 in the installed state is thus subjected to a prestress, which ensures that the parts introduced into the housing 33 are held securely. A traditional locking part may readily be omitted which greatly simplifies the assembly of the hinge part 9. This leads to cost savings resulting from the fact that the number of parts required to produce the hinge part 9 is reduced. The hinge part 9 may be handled as a preassembled module because the hinge element 35 and the spring element 39 are securely held in the housing 33 by the prestress produced by the spring element.

A separate locking part in particular may be omitted because the abutment W is formed directly by the housing 33 namely by a wall section of a greater wall thickness in the transitional area between the bushing 61 and the recess 59.

The hinge element 35 is mounted in the interior of the housing 33 so that it is displaceable in the longitudinal direction thereof. The dimensions of the guide section 41 and the bushing 61 are coordinated with one another so that the hinge element 35 is guided securely in the bushing 61 in the area of the guide section 41. In particular the width of the guide section 41—measured at a right angle to the longitudinal extent of the housing 33—corresponds preferably to the width of the bushing 61 so that the outer side faces of the guide section 41 here slide on the inner side faces of the bushing 61. Furthermore, the height of the guide section 41 preferably corresponds to the height of the bushing 61 so that a surface of the guide section 41 (not shown here) also slides on a base surface of the bushing 61 (also not shown here). A lower surface 65 is preferably flush with the lower surface 53 of the housing 33 so that it slides on the spectacles element (not shown here) which is embodied here as an earpiece 5 when the hinge part 9 is attached to it. On the whole the hinge element 35 is thus guided securely in the area of the guide section 41, preferably from all sides, so that it is displaceable exclusively in the axial direction and in particular is secured to prevent it from rotating about its longitudinal axis.

A separate locking part may be omitted in particular because the abutment W is formed directly by the housing 33 namely by a wall section of a greater wall thickness in the transitional area between the bushing 61 and the recess 59.

The hinge element 35 is mounted in the interior of the housing 33 so that it is displaceable in the longitudinal direction thereof. The dimensions of the guide section 41 and the bushing 61 are coordinated with one another so that the hinge element 35 is securely guided in the bushing 61 in the area of the guide section 41. The width of the guide section 41 (measured at a right angle to the longitudinal extent of the housing 33) preferably correspond in particular to the width of the bushing 61 so that the outer side faces of the guide section 41 slide here on the inner side faces of the bushing 61. Furthermore, the height of the guide section 41 preferably corresponds to the height of the bushing 61 so that a surface (not shown here) of the guide section 41 slides on a base face of the bushing 61 which is also now shown here. A lower face 65 is preferably flush with the lower face 53 of the housing 33 so that it slides on the spectacles element (not shown here) which is designed as an eyepiece 5 when the hinge part 9 is attached thereto. Thus on the whole the hinge element 35 is guided securely in the area of the guide section 41, preferably from all sides, so that it is displaceable only in the axial direction and in particular is secured to prevent it from rotating about its longitudinal axis.

The height of the spring element 39 is preferably adapted to the height of the recess 59. The same thing is preferably also true of an end section 47 having the stop face 49, the shape and/or diameter of this end section preferably being selected so that it slides on the spectacles element on the one hand and on the other hand slides on at least one side face or surface of the recess 59. The spring element 39 and the end section 47 are preferably guided securely on all surfaces bordering the recess 59. This in turn ensures an optimal guidance of the hinge element 35 in the interior of the housing 33.

FIG. 9 shows that the end face 57 of the housing 33 is set back somewhat in the area of a bevel 67. The nose 51 on the hinge element 35 and the nose 67 on the housing 33 are preferably designed to be complementary to one another so that this provides additional means of securing the hinge element 35 when the nose 51 comes in contact with the bevel 67. The hinge element 35 is therefore held in the housing 33 not only by frictional forces but also by a form-fitting connection. Due to the fact that the nose 51 is pressed against the bevel 67 of the housing 33 because of the prestress on the spring element 39, the result is a sealing effect so that the interior of the housing 33, i.e., the bushing 61 and the recess 59 are protected from soiling. In particular the guide area 41 is sealed so tightly with the bushing 61 that from the end face 57 no soil and preferably also no liquids can penetrate into the housing 33.

On the whole it is found that the spring element 39 together with the hinge element 35 is inserted as a module into the recess 59 so that the spring element 39 acts upon the hinge element 35 with a force which leads to a friction connection and/or a form-fitting connection between the hinge element 35 and the housing 33.

It has been found that the interior of the housing 33 can be sealed in an airtight and/or fluid-tight manner if a peripheral weld is produced along the peripheral edge 55. Loss of the function of the hinge part 9 which is designed as a spring hinge due to corrosion and/or soiling can thus be reliably prevented.

To perform the laser welding method only low mechanical pressing forces which are just sufficient to securely hold the housing 33 on the spectacles element are required. The thermal load on the hinge part 9 is also very low because in the laser welding method proposed here, the surroundings of the area 19 in which the weld 17 is being produced are heated only very locally. The heat input here is reduced to a minimum and is definitely lower than that in deep penetration welding for example. Because of the low thermal load, it is possible to attach the hinge part 9 as a premounted module on a spectacles element embodied for example, as an earpiece 5. The low mechanical and thermal stress permit thin wall thicknesses in the area of the housing 33 so that the hinge part 9 can also be narrow and have thin walls. It is also possible to attach cohesive, i.e., premountable spring hinges by means of this laser welding method without any damage to sensitive parts such as springs due to an excessive heat input such as that which occurs in electric welding, soldering and deep penetration welding. Due to the fact that the housing 33 itself has an abutment W which acts as a lock, it may also be designed to be narrower and shorter, i.e., to be more compact on the whole because no additional separate locking part is necessary.

The hinge part 9 thus comprises only three components, namely the hinge element 35, the spring element 39 and the housing 33. The hinge element 35 and the spring element 39 may be inserted as a preassembled module into the housing 33. Due to the prestressing force prevailing in the area of the spring element 39, this module is held securely in the housing 33 so that a premounted unit and/or module is formed form hinge element 35, spring element 39 and housing 33. This may also be handled as a unit and placed on a spectacles element preferably embodied as an earpiece 5 and secured there. On the whole this also yields an extremely simple handling so that the assembly of the hinge part 9 on a spectacles element can be automated to a high degree, thereby permitting especially inexpensive production. The laser welding method also makes a significant contribution toward simpler automation of the process because welding robots can preferably be used there.

The recess 59 and the bushing 61 are preferably either shaped in the manufacturing of the housing 33, for example, in a casting or sintering operation and/or a metal injection molding process (MIM process) or they are preferably introduced by a cutting method of machining. The width and depth of the recess 59 and/or the bushing 61 are adapted to the elements to be introduced.

It is essential for the spring element 39 to act upon the hinge element 35 with a compressive force by means of which the hinge element 35 is pulled into the interior of the housing 33 but can be extracted out of the housing 33 against the force of the spring element 39 at least for a predefinable distance. Therefore the hinge element 35 is mounted to be displaceable in the longitudinal direction of the hinge part 9.

As shown in FIG. 5 it is also possible to widen the module by the earpiece blank 25. Since this is divided in the area of the bending zone 27 into an earpiece part 29 and a faceplate part 31, the faceplate part 31 may be secured on the middle part 3 of spectacles 1. This further simplifies assembly because the entire hinge 7 can easily be secured on an earpiece blank 25, whereas it is more complex to first attach the hinge part 9 to an earpiece 5 so that only then can the hinge part 11 be attached to a middle part 3. In the converse arrangement of the hinge parts 9, 11, assembly is also simpler in cases when they must be arranged independently of one another on the different spectacle elements.

On the basis of FIG. 9, it is also seen that at least the first hinge part 9 attached to the at least one earpiece 5 preferably has an open base. This reduces its overall height so that it can be smaller than if a closed base had to be provided in the area of the face 53. A base may be omitted here because an airtight and/or fluid-tight connection of the hinge part 9 to the spectacles element arranged beneath it is possible with the help of the laser welding method.

On the whole it is found that the spectacles 1 and the device according to the invention may comprise a variety of materials that were not previously accessible in the state of the art, at least to the laser welding method, in particular including nickel silver, by virtue of the method according to the invention. These materials may also be combined with one another in virtually any manner. The laser welding method according to the invention prevents the formation of vapors of materials that are sensitive to oxidation, in particular metals, due to a reduced continuous heat input, so that the resulting weld is not embrittled or does not split open due to oxides, in particular metal oxides such as zinc oxide. This permits a more secure and more lasting connection of the hinge parts with the respective spectacles elements. In addition, it is found that the method can proceed with a high degree of automation. The time required for fastening a hinge part in particular can be reduced drastically by using a pulsed laser with an extended pulse duration, so that especially preferably all the welds can be produced with a single laser pulse during its period. Because of the low thermal and mechanical stresses which occur in laser welding methods, it is possible to manufacture the hinges that are to be welded, in particular the hinge parts designed as spring hinges, to be especially narrow, with thin walls and with a small height, i.e., to be compact on the whole. Since an airtight and/or fluid-tight connection can be achieved, it is additionally possible to omit having a closed base in the area of the hinge part, thereby further reducing its overall height.

After all of this, it is clear that the laser welding method described here is characterized by a very minor and uniform input of heat into the components that are to be joined. Using continuous wave lasers, in particular diode lasers or the pulsed method of the type described above produces a very clean appearance of the seam.

It has also been found that the device which is required for joining a spring hinge to a spectacles part can be manufactured relatively inexpensively. The design of this device is simple and therefore requires little maintenance. It is also important that a device for performing the method described here can turn out to be more compact than is the case with known systems.

As described it is especially advantageous that pre mounted spring hinges containing sensitive components can be processed here because the heat input is so low that even sensitive springs in the housing of the spring hinge are not damaged and in particular are not calcined. Even very small housings having relatively thin walls can be processed in this way because even thin materials remain undamaged at this low level of heat input. In particular it is also possible to join parts of nickel silver together because the relatively low temperature is not sufficient to induce outgassing of the components of nickel silver, which usually leads to embrittlement of the seam.

The invention claimed is:

1. Spectacles comprising:
   a first element;
   a second element, the second element arranged on the first element, the first and second elements attached to one another by laser welding; and
   at least one continuous weld produced by conduction welding and formed on at least one longitudinal edge of one of the first and second elements.

2. Spectacles according to claim 1, wherein the first element comprises a hinge having a first hinge part and a second hinge part, wherein the second element comprising one of a middle part and at least one earpiece, wherein the first hinge part is arranged on the at least one earpiece and the second hinge part is arranged on the middle part, at least one of the first and second hinge parts attached to one of the middle part and the earpiece by the laser welding, and wherein the at least one continuous weld is formed on at least one longitudinal edge of one of the first and second hinge parts.

3. Spectacles according to claim 2, wherein at least one of the hinge parts and/or the at least one earpiece and/or the middle part is at least partially made of nickel silver.

4. Spectacles according to claim 2, wherein at least one of the hinge parts and/or the at least one earpiece and/or the middle part is at least partially made of INOX or titanium.

5. Spectacles according to claim 2, wherein the weld has an appearance resembling that of a soldered seam.

6. Spectacles according to claim 2, wherein at least the first hinge part attached to the at least one earpiece has an open base.

7. Spectacles according to claim 2, wherein at least the first hinge part attached to the at least one earpiece is premountable.

8. A device comprising: a first spectacles element;
   a second spectacles element; the second spectacles element arranged on the first spectacles element and attached by laser welding;
   wherein at least one continuous weld, which is produced by conduction welding, is formed at least on one longitudinal edge of one of the first and second spectacles elements for fastening the first and second spectacles elements.

9. The device according to claim 8, wherein the first spectacle element comprises a hinge having a first hinge part and a second hinge part, wherein the second spectacle element comprising one of a middle part and at least one earpiece, wherein the first hinge part is arranged on the at least one earpiece and the second hinge part is arranged on the middle part, at least one of the first and second hinge parts attached to one of the middle part and the earpiece by the laser welding, and wherein the at least one continuous weld is formed on at least one longitudinal edge of one of the first and second hinge parts.

10. The device according to claim 9, wherein the hinge part and/or the spectacles element is at least partially made of nickel silver.

11. The device according to claim 9, wherein the hinge part and/or the spectacles element is at least partially made of INOX or titanium.

12. The device according to claim 9, wherein the weld has an appearance resembling that of a soldered seam.

13. The device according to claim 9, wherein the hinge part has an open base.

14. The device according to claim 9, wherein the hinge part is premountable.

15. The device according to claim 9, wherein the hinge part is a spring hinge.

16. A method for attaching a first spectacles element to a second spectacles element, the method comprising:
   arranging the first spectacles element on the second spectacles element; and
   fastening the first spectacles element to the second spectacles element by producing at least one continuous weld at least along a longitudinal edge of the first spectacles element,
   wherein the weld is produced by conduction welding.

17. The method according to claim 16, wherein the first spectacles element is a hinge part.

18. The method according to claim 17, wherein a material comprising nickel silver, is used as the material of the hinge part and/or the second spectacles element.

19. The method according to claim 17, wherein the weld is produced in such a way that it has an appearance resembling that of a soldered seam.

20. The method according to claim 17, wherein the hinge part is premounted before being arranged on the second spectacles element.

21. The method according to claim 17, wherein the weld is produced using a pulsed laser.

22. The method according to claim 17, wherein the weld is finished using a pulsed laser during the duration of a single laser pulse.

23. The method according to claim 17, wherein a filler material is used to produce the weld.

24. The method according to claim 17, wherein the weld is finished using a laser beam of a lower intensity to improve its appearance from an aesthetic standpoint.

* * * * *